United States Patent
Iannuzzi et al.

(10) Patent No.: US 8,522,606 B2
(45) Date of Patent: Sep. 3, 2013

(54) SIMILITUDE TESTING OF COMPRESSOR PERFORMANCE

(75) Inventors: Gianni Iannuzzi, Scandicci (IT); Carlo Bacciottini, Siena (IT); Giovanni Cecchi, Prato (IT)

(73) Assignee: Nuovo Pignone S.p.A., Florence (IT)

( * ) Notice: Subject to any disclaimer, the term of this patent is extended or adjusted under 35 U.S.C. 154(b) by 70 days.

(21) Appl. No.: 13/334,300

(22) Filed: Dec. 22, 2011

(65) Prior Publication Data

US 2012/0160021 A1   Jun. 28, 2012

(30) Foreign Application Priority Data

Dec. 22, 2010   (IT) .............................. MI2010A2376

(51) Int. Cl.
*G01M 15/14*   (2006.01)

(52) U.S. Cl.
USPC ....................................................... 73/112.05

(58) Field of Classification Search
USPC ....................................................... 73/112.05
See application file for complete search history.

(56) References Cited

U.S. PATENT DOCUMENTS

| | | | |
|---|---|---|---|
| 6,893,995 B2 | 5/2005 | Thomas et al. | |
| 7,886,836 B2 * | 2/2011 | Haaland et al. | ................. 169/46 |
| 2004/0089839 A1 | 5/2004 | Thomas et al. | |
| 2005/0166607 A1 | 8/2005 | Brasz et al. | |
| 2005/0233934 A1 | 10/2005 | Singh et al. | |
| 2005/0245421 A1 | 11/2005 | Singh et al. | |
| 2006/0269484 A1 | 11/2006 | Knopeck et al. | |
| 2007/0039635 A1 | 2/2007 | Thompson et al. | |
| 2008/0003127 A1 | 1/2008 | Luly et al. | |
| 2008/0026977 A1 | 1/2008 | Thomas et al. | |
| 2008/0051610 A1 | 2/2008 | Wang et al. | |
| 2008/0051611 A1 | 2/2008 | Wang et al. | |
| 2008/0135817 A1 | 6/2008 | Luly et al. | |
| 2008/0203349 A1 | 8/2008 | Singh et al. | |
| 2008/0230738 A1 | 9/2008 | Minor et al. | |
| 2008/0255260 A1 | 10/2008 | Bowman et al. | |
| 2009/0088593 A1 | 4/2009 | Tung et al. | |

(Continued)

FOREIGN PATENT DOCUMENTS

| | | |
|---|---|---|
| EP | 0580732 B1 | 12/1994 |
| EP | 0703208 A1 | 3/1996 |

(Continued)

OTHER PUBLICATIONS

Kontomaris, et al. "A Non-Flammable, Reduced GWP, HFC-134a Replacement in Centrifugal Chillers: DR-11;" International Refrigeration and Air Conditioning Conference at Purdue, Jul. 12-15, 2010.

(Continued)

*Primary Examiner* — Freddie Kirkland, III
(74) *Attorney, Agent, or Firm* — Global Patent Operation

(57) ABSTRACT

A method for similitude testing of a turbomachine, the method comprising selecting a test gas having a molecular weight between 40 g/gmol and 150 g/gmol, a global warming potential (GWP) of less than 700, and a gas specific heat ratio of between 1 and 1.5; operating the turbomachine using the selected test gas; identifying at least one parameter while operating the turbomachine; establishing at least one test parameter associated with the at least one parameter; and comparing the at least one test parameter with a corresponding at least one specified parameter to determine whether the turbomachine has passed the similitude test.

10 Claims, 7 Drawing Sheets

(56) References Cited

U.S. PATENT DOCUMENTS

| | | |
|---|---|---|
| 2009/0095717 A1 | 4/2009 | Luly et al. |
| 2009/0204447 A1 | 8/2009 | Tucker et al. |
| 2009/0253820 A1 | 10/2009 | Bowman et al. |
| 2009/0267019 A1 | 10/2009 | Yana Motta et al. |
| 2009/0269478 A1 | 10/2009 | Nalewajek et al. |
| 2009/0272134 A1 | 11/2009 | Hulse et al. |
| 2009/0278075 A1 | 11/2009 | Mahler et al. |
| 2009/0283712 A1 | 11/2009 | Zyhowski et al. |
| 2009/0287026 A1 | 11/2009 | Kopkalli et al. |
| 2009/0305876 A1 | 12/2009 | Singh et al. |
| 2010/0044620 A1 | 2/2010 | Rached |
| 2010/0090156 A1 | 4/2010 | Nappa et al. |
| 2010/0105967 A1 | 4/2010 | Nappa |
| 2010/0122545 A1 | 5/2010 | Minor et al. |
| 2010/0123095 A1 | 5/2010 | Minor et al. |
| 2010/0154419 A1 | 6/2010 | Kontomaris |
| 2010/0172701 A1 | 7/2010 | Tucker et al. |
| 2010/0185027 A1 | 7/2010 | Wang et al. |
| 2011/0259039 A1* | 10/2011 | Ma et al. .................... 62/495 |

FOREIGN PATENT DOCUMENTS

| | | |
|---|---|---|
| EP | 2157073 A1 | 2/2010 |
| JP | 55123392 A | 9/1980 |
| JP | 2010164043 A | 7/2010 |
| WO | 03044277 A2 | 5/2003 |
| WO | 2006069362 A2 | 6/2006 |
| WO | 2006101882 A2 | 9/2006 |
| WO | 2008061053 A2 | 5/2008 |
| WO | 2008061072 A2 | 5/2008 |
| WO | 2008061074 A2 | 5/2008 |
| WO | 2008061079 A2 | 5/2008 |
| WO | 2008061083 A2 | 5/2008 |
| WO | 2009002910 A2 | 12/2008 |
| WO | 2009047535 A2 | 4/2009 |
| WO | 2009048802 A2 | 4/2009 |
| WO | 2009048807 A2 | 4/2009 |
| WO | 2009048826 A2 | 4/2009 |
| WO | 2009076120 A2 | 6/2009 |
| WO | 2009137656 A1 | 11/2009 |
| WO | 2009137658 A2 | 11/2009 |
| WO | 2010009090 A2 | 1/2010 |
| WO | 2010042781 A2 | 4/2010 |
| WO | 2010059677 A2 | 5/2010 |
| WO | 2010059685 A1 | 5/2010 |
| WO | 2010062888 A2 | 6/2010 |
| WO | 2010080467 A2 | 7/2010 |
| WO | 2010080544 A1 | 7/2010 |

OTHER PUBLICATIONS

Brasz, J.J., "Variable-speed centrifugal compressor behavior with low GWP refrigerants," Danfoss Turbocor Compressors Inc., Syracuse University Center for Science and Technology, USA. International Conference on Compressors and their Systems: City University London, UK Sep. 7-9, 2009; Oxford: Chandos Publ, BB, Sep. 7, 2009, pp. 247-256.

Kontomaris and Leck; "Low GWP Refrigerants for Centrifugal Chillers," Ashrae Annual Conference—papers presented as the 2009 Annual Conference in Louisville, Kentucky of the American Society of Heating, Refrigerating and Air-Conditioning Engineers, Inc.

Nathoo and Gotten Berg; "A New Look at Performance Analysis of Centrifugal Compressors Operating with Mixed Hydrocarbon Gases," ASME; vol. 105, Oct. 1983, p. 920-926.

Italian Search Report in connection with IT Application MI20102376 filed on Dec. 22, 2010, issued on Aug. 10, 2011.

Marcelo, Accorsi Miranda et al: ASME PTC 10 modified test for mechanical assessment of centrifugal compressors:,Proceedings of the Turbomachinery Symposium, Jan. 1, 2007, pp. 87-94.

EP Partial Search Report dated May 10, 2012 from corresponding EP Application No. 11192714.1.

* cited by examiner

| Gas | Lifetime (years) SAR | Lifetime (years) TAR | GWP (100 years) SAR | GWP (100 years) TAR | Difference | |
|---|---|---|---|---|---|---|
| Carbon dioxide ($CO_2$) | 50-200 | 5-200[c] | 1 | 1 | NC | NC |
| Methane ($CH_4$)[b] | 12±3 | 8.4/12[a] | 21 | 23 | 2 | 10% |
| Nitrous Oxide ($N_2O$) | 120 | 120/114[a] | 310 | 296 | (14) | -5% |
| Hydrofluorocarbons | | | | | | |
| HFC-23 | 264 | 260 | 11,700 | 12,000 | 300 | 3% |
| HFC-32 | 5.6 | 5.0 | 650 | 550 | (100) | -15% |
| HFC-41 | 3.7 | 2.6 | 150 | 97 | (53) | -35% |
| HFC-125 | 32.6 | 29 | 2,800 | 3,400 | 600 | 21% |
| HFC-134 | 10.6 | 9.6 | 1,000 | 1,100 | 100 | 10% |
| HFC-134a | 14.6 | 13.8 | 1,300 | 1,300 | NC | NC |
| HFC-143 | 3.8 | 3.4 | 300 | 330 | 30 | 10% |
| HFC-143a | 48.3 | 52 | 3,800 | 4,300 | 500 | 13% |
| HFC-152 | NA | 0.5 | NA | 43 | NA | NA |
| HFC-152a | 1.5 | 1.4 | 140 | 120 | (20) | -14% |
| HFC-161 | NA | 0.3 | NA | 12 | NA | NA |
| HFC-227ea | 36.5 | 33.0 | 2,900 | 3,500 | 600 | 21% |
| HFC-236cb | NA | 13.2 | NA | 1,300 | NA | NA |
| HFC-236ea | NA | 10 | NA | 1,200 | NA | NA |
| HFC-236fa | 209 | 220 | 6,300 | 9,400 | 3,100 | 49% |
| HFC-245ca | 6.6 | 5.9 | 560 | 640 | 80 | 14% |
| HFC-245fa | NA | 7.2 | NA | 950 | NA | NA |
| HFC-265mtc | NA | 9.9 | NA | 890 | NA | NA |
| HFC-4310mee | 17.1 | 15 | 1,300 | 1,500 | 200 | 15% |
| Iodocarbons | | | | | | |
| FIC-1311 | <0.005 | 0.005 | <1 | 1 | NC | NC |
| Fully Fluorinated Species | | | 7,500 | 8,900 | 1,400 | 19% |
| $SF_6$ | 3,200 | 3,200 | 23,900 | 22,000 | (1,900) | -8% |
| $CF_4$ | 50,000 | 50,000 | 6,500 | 5,700 | (800) | -12% |
| $C_2F_6$ | 10,000 | 10,000 | 9,200 | 11,900 | 2,700 | 29% |
| $C_3F_8$ | 2,600 | 2,600 | 7,000 | 8,600 | 1,600 | 23% |
| $C_4F_{10}$ | 2,600 | 2,600 | 7,000 | 8,600 | 1,600 | 23% |
| $c\text{-}C_4F_8$ | 3,200 | 3,200 | 8,700 | 10,000 | 1,300 | 15% |
| $C_5F_{12}$ | 4,100 | 4,100 | 7,500 | 8,900 | 1,400 | 19% |
| $C_6F_{14}$ | 3,200 | 3,200 | 7,400 | 9,000 | 1,600 | 22% |

FIG. 5

SIMILITUDE TESTING OF COMPRESSOR PERFORMANCE

BACKGROUND OF THE INVENTION

1. Field of the Invention

Embodiments of the present invention generally relate to methods and systems and, more particularly, to mechanisms and techniques for similitude testing of compressors.

2. Description of the Prior Art

A compressor is a machine which increases the pressure of a compressible fluid, e.g., a gas, through the use of mechanical energy. Compressors are used in a number of different applications. Among the various types of compressors used in such processes and process plants are the so-called centrifugal compressors, in which the mechanical energy operates on gas input to the compressor by way of centrifugal acceleration which accelerates the gas particles, e.g., by rotating a centrifugal impeller or rotor through which the gas passes.

Centrifugal compressors can be fitted with a single impeller or stage, a single stage configuration, or with a plurality of stages in series, in which case they are frequently referred to as multistage compressors. In turn, a specific sub-family of multi-stage compressor comprises a multi-section multistage compressor which is configured such that the totality of the compressor flow is extracted from the compressor, cooled down and then re-injected into the compressor. Most of the time, the number of sections in this sub-family of multistage compressor is limited to two which sections can be arranged in either an in-line or a back-to-back configuration depending on a relative orientation of the impellers of a second section with respect to the impellers in a first section.

Each of the stages of a centrifugal compressor typically comprises an inlet conduit for gas to be compressed, an impeller or wheel which is capable of providing kinetic energy to the input gas and an exit system, referred to as a stator, which converts the kinetic energy of the gas leaving the rotor into pressure energy. Multiple stator component configurations can be used, the most common ones being the vaneless diffuser, the vaned diffuser return channel, discharge scroll or plenum or combinations of these configurations. The combination of an individual impeller and its associated stator component is typically referred to as a stage.

During the compressor design development phase and prior to being placed into service by end users, centrifugal compressors are typically subjected to a number of different types of tests as part of, for example, performance validation activities and quality control processes. One such test is a similitude test, which attempts to ensure that the centrifugal compressor will operate in the manner desired by an end user with respect to flow rate, pressure rise, efficiency and speed for a given input gas. To perform the similitude test, a manufacturer operates the centrifugal compressor under test conditions which are intended, to be as close as possible to those which will be experienced by the centrifugal compressor at the end user's client's site. To achieve these objectives, it is desirable to provide similitude testing systems and methods for compressors wherein the test gas used in the compressor is appropriately selected. Typically, the gas R134A (also known as HFC-134a) is internationally used in purity or mixture as working fluid to provide the similitude test.

SUMMARY OF THE INVENTION

According to an embodiment of the present invention, a method for similitude testing of a turbomachine is provided. The method comprises selecting a test gas having a molecular weight between 40 g/gmol and 150 g/gmol, a global warming potential (GWP) of less than 700, and a gas specific heat ratio of between 1 and 1.5, operating the turbomachine using the selected test gas, identifying at least one parameter while operating the turbomachine, establishing at least one test parameter associated with the at least one parameter, and comparing the at least one test parameter with a corresponding at least one specified parameter to determine whether the turbomachine has passed the similitude test.

According to another embodiment of the present invention, a test system for a turbomachine is provided. The system comprises, at least one sensor configured to measure at least one parameter while operating the turbomachine, a processor configured to calculate at least one test parameter associated with the at least one measured parameter and to compare the at least one calculated test parameter with a corresponding at least one specified parameter to determine whether the turbomachine has passed the similitude test, wherein the turbomachine is operated using a selected test gas, the selected test gas having a molecular weight between 40 g/gmol and 150 g/gmol, a global warming potential (GWP) of less than 700, and a gas specific heat ratio of between 1 and 1.5.

According to another embodiment of the present invention, a turbomachine made using a similitude testing method is provided. The testing method includes selecting a test gas having a molecular weight between 40 g/gmol and 150 g/gmol, a global warming potential (GWP) of less than 700, and a gas specific heat ratio of between 1 and 1.5, operating the turbomachine using the selected test gas, detecting at least one parameter while operating the turbomachine, establishing at least one test parameter associated with the at least one parameter, and comparing the at least one test parameter with a corresponding at least one specified parameter to determine whether the turbomachine has passed the similitude test.

BRIEF DESCRIPTION OF THE SEVERAL VIEWS OF THE DRAWINGS

The accompanying drawings, which are incorporated in and constitute a part of the specification, illustrate one or more embodiments and, together with the description, explain these embodiments.

In the drawings:

FIG. 5 is a list of gases which were considered as potential substitutes for HFC-134a according to an embodiment of the present invention;

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a multistage centrifugal compressor. However, the embodiments to be discussed next are not limited to this specific type of centrifugal compressor, but may be applied to other types of machinery, including, but not limited to, axial compressors, centrifugal pumps, turboexpanders, etc., all of which machines are referred to collectively herein as "turbomachinery" or "turbomachines".

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
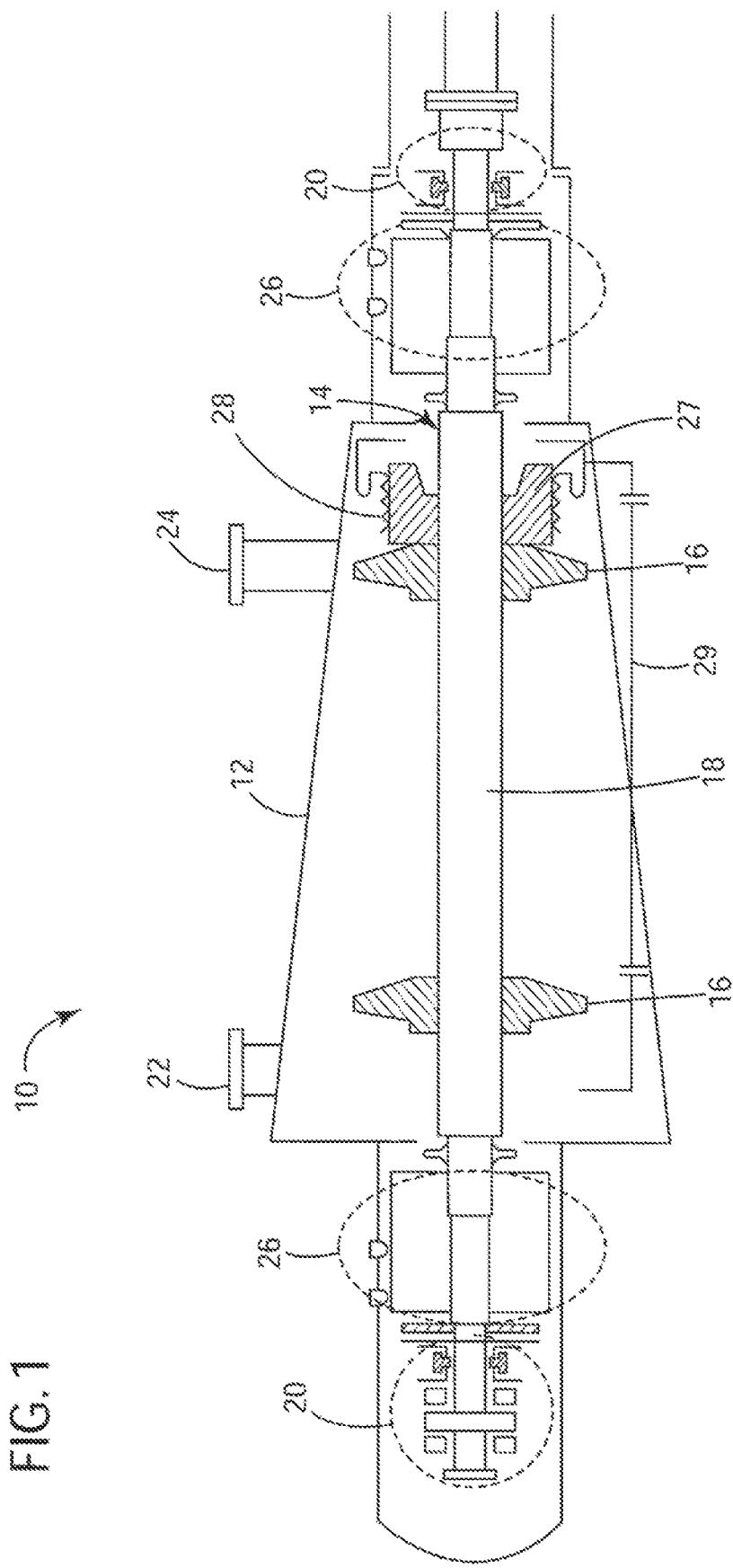
FIG. 1 is a schematic diagram of a turbomachine according to an embodiment of the present invention.

To provide some context for the subsequent discussion relating to similitude testing according to these exemplary embodiments, FIG. 1 schematically illustrates an exemplary multistage centrifugal compressor 10. Therein, the compressor 10 comprises a box or housing (stator) 12 within which is mounted a rotating compressor shaft 14 that is provided with a plurality of centrifugal impellers 16. The rotor assembly 18 comprises the shaft 14 and impellers 16 and is supported radially and axially through bearings 20 which are disposed on either side of the rotor assembly 18. The multistage centrifugal compressor operates to take an input process gas from inlet duct 22, to increase the process gas' pressure through operation of the rotor assembly 18, and to subsequently expel the process gas through outlet duct 24 at an output pressure which is higher than its input pressure. The process gas used after the compressor is placed into service by an end user may, for example, be any one of carbon dioxide, hydrogen sulfide, butane, methane, ethane, propane, liquefied natural gas, or a combination thereof. Between the rotors 16 and the bearings 20, sealing systems 26 are provided to prevent the process gas from flowing to the bearings 20. The housing 12 is configured to cover both the bearings 20 and the sealing systems 26, to prevent the escape of gas from the centrifugal compressor 10. The bearings 20 may be implemented as either oil-lubricated bearings or active magnetic bearings, if active magnetic bearings are used as bearings 20, then the sealing mechanisms 26 may be omitted.

The centrifugal compressor 10 also comprises a balance piston (drum) 28 along with its corresponding labyrinth seal 30. A balance line 32 maintains the pressure in a balance chamber 31 on the outboard side of the balance drum at the same (or substantially the same) pressure as that of the process gas entering via the inlet duct 22.

Figure 2:
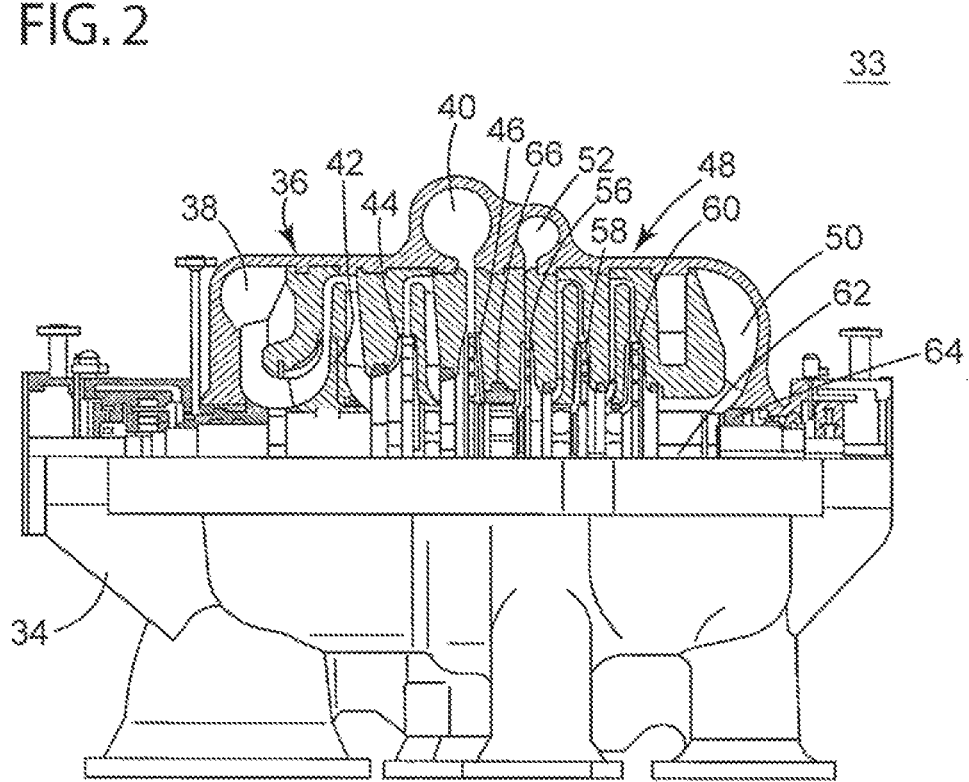
FIG. 2 is a partial cutaway view of a back-to-back turbomachine according to an embodiment of the present invention.

The configuration illustrated and discussed above involves a so-called "straight-through" compressor configuration, wherein the process or working gas enters via the inlet duct 22 on one end of the housing 12 and exits via the outlet duct 24 at another end of the housing 12. However, as mentioned in the Background section, another compressor configuration which is sometimes employed is the so-called "back-to-back" compressor configuration wherein two substantially independent compressors share a single rotor 18, an example of which is illustrated in FIG. 2.

Therein, the upper half of the housing 31 is cut-away to reveal the inner workings of the back-to-back compressor 33 including a first compressor section 36 having an inlet duct 38 and an outlet duct 40 near the middle of the compressor. Between the inlet duct 38 and the outlet duct 40 in the first section are three impeller stages 42, 44 and 46 which operate as described above to pressurize the working gas. Similarly, the second compressor section 48 has an inlet duct 50 and an outlet duct 52, the latter of which is also proximate the middle of the compressor 33, and has three impeller stages 54, 46, and 58 associated therewith. Typically, the inlet duct 50 is connected to outlet duct 40 of the first section 36 after the flow has been cooled and the compression process of the gas then continues up to second section's outlet duct 52.

Unlike the straight-through, single section compressor 10, the back-to-back compressor 33 has two balancing pistons or drums with the same (or substantially the same) diameter to provide for a balanced rotor 62. This is due, at least in part, to the fact that the two compressor sections 36 and 48 will have different pressures associated with them, especially when the compressor 33 is in a stopped or stand-by mode. A first balancing piston or drum 64 is disposed under the inlet duct 50 of the second compressor section, while a second balancing piston or drum 66 is placed in the middle of the compressor 33 between the first compressor section 36 and the second compressor section 48. In operation, balance drum 64 will experience, on one of its faces, the suction pressure of the second section 48 while the other face of the balance drum 64 will experience the suction pressure of the first section 36 due to connection of this face to the first section inlet 38 by mean of an external pipe called a balanced line. Both the first and second balancing drums 64, 66 rotate with the rotor 62.

With the foregoing as context, performance testing according to exemplary embodiments of compressors such as those described above with respect to FIGS. 1 and 2 will now be described. To test the performance of centrifugal compressors various types of similitude tests have been defined by the American Society of Mechanical Engineers' (ASME) in a standard referred to as the Power Test Code-10 (PTC-10). Since all fluid flow is governed by the conservation equations of mass, energy and momentum, the PTC-10 embodies the correlations between these equations in a set of test rules which allow a compressor operator or manufacturer to verify that a compressor under test will perform as specified, i.e., by delivering a specified flow of the process gas, at the specified inlet conditions, to the specified pressure rise with the specified efficiency and speed (RPM).

The ASME PTC-10 defines three different classes of similitude tests Class 1, Class 2 and Class 3 (also sometimes referred to as Type 1, Type 2 and Type 3 tests, respectively). In Class 1 PTC-10 tests, the similitude test is conducted very close to the site at which the compressor is ultimately to be installed and operating with limited deviations permitted between site conditions and test conditions. For example, in Class 1 PTC-10 tests, the test gas and the specified process gas, as well as the inlet and outlet conditions, must be identical. The Class 2 PTC-10 permits more deviations between site conditions and test conditions, e.g., to provide a testing paradigm which enables compressor manufacturers to test the compressors which they make prior to delivering them to their customers. Thus, for example, in a Class 2 PTC-10 test, the test gas need not be identical to the specified process gas to be used by the customer when the compressor is installed. However the compressor's test speed, pressure, temperature and flow rates are all adjusted so that the test condition is dynamically equivalent to the specified condition. The Class 3 PTC-10 test is substantially similar to the Class 2 PTC-10 test, except that the equations used to calculate compressor performance are different and are used for Class 3 PTC-10 tests when the ratio of specific heats (for either the test gas or the specified process gas) varies excessively from compressor inlet to compressor outlet.

Figure 3:
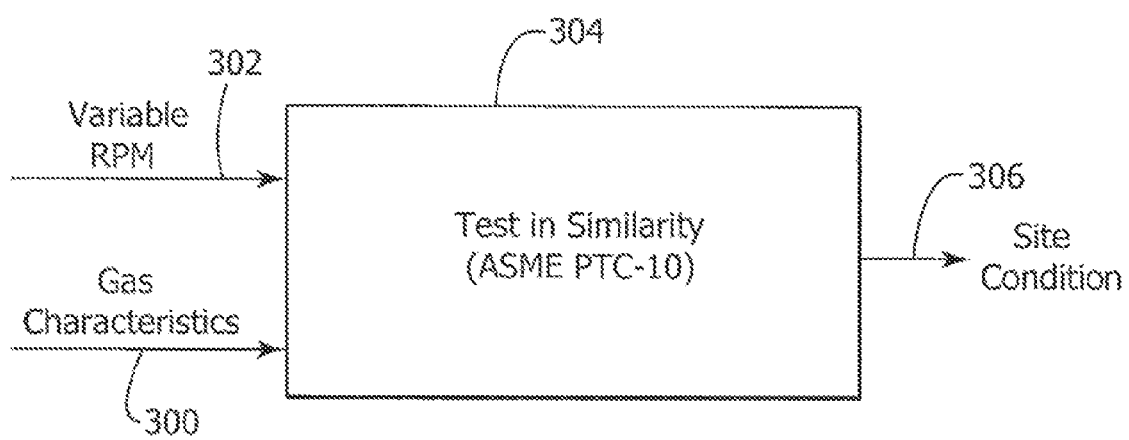
FIG. 3 shows inputs and output associated with a similitude test of a turbomachine according to an embodiment of the present invention.

Thus it will be appreciated by those skilled in the art that the selection of a particular test gas for Class 2 and Class 3 PTC-10 tests is an important aspect in performing similitude tests for compressors. For example, the selection of a test gas having suitable characteristics directly affects test volume reduction. Moreover, a selected test gas should not cause any operating condition of the compressor to be exceeded, such as discharge temperature and maximum continuous speed. Conceptually, as shown in FIG. 3, the gas characteristics 300 of the test gas and the speed (RPM) 302 of operation are the two fundamental input variables to an ASME PTC-10 similitude test 304 from which an output is generated that should be very close to the test site conditions 306. Of particular importance in terms of the gas characteristic is the molecular weight of the test gas. If the molecular weight is too low as compared to the specified process gas, then the test speed may exceed the maximum continuous speed of the compressor. Thus, it is preferable that the test gas have a molecular weight which is wry close to or higher than the molecular weight of the specified process gas.

Figure 4:
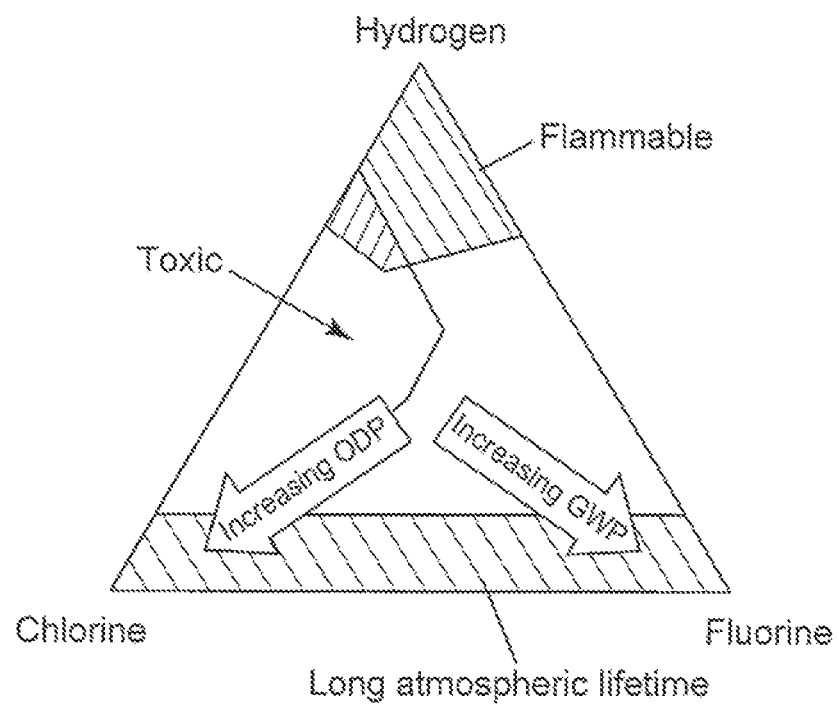
FIG. 4 depicts characteristics of gases within the hydrofluorocarbon family according to an embodiment of the present invention.

Other characteristics of the test gas are also important to consider. For example, thermodynamic characteristics of the test gas, such as its k value associated with thermal conductivity, its calorific power, its poly-tropic coefficient and its specific heat coefficient should also be considered, Conventionally, one test gas that was used in similitude testing of compressors, either in purity or in a mixture with other gases, was a hydrofluorocarbon (HFC) known as HFC-134a, also known by its chemical name as 1,1,1,2-Tetrafluoroethane. However one problem with using HFC-134a as a test gas in similitude testing for compressors is that it has a relatively high greenhouse effect contribution. For example, HFC-134a has a global warming potential (GWP) of about 1300 relative to a comparable amount of carbon dioxide, which is used as the GWP relative standard. Accordingly, it would be desirable to select one or more other test gases as substitutes for HFC-134a in similitude testing of compressors. However selecting other test gases is challenging, in addition to the afore-described considerations, which relate to ASME PFC-10 testing requirements, other, practical parameters should also be considered, e.g., whether the gas is flammable, whether the gas is toxic (to the touch or on contact) and also its Ozone Depletion Potential (ODP). Unfortunately, many of these considerations compete with one another. For example, as shown conceptually in FIG. 4, for HFCs as the number of chlorine atoms in the compound increase, so too does the ODP. Similarly, as the number of fluorine atoms in the compound increase, so too does the GWP. As the number of hydrogen atoms dominates the mix, the compound becomes more flammable. According to exemplary embodiments, Applicants have, after evaluating a large number of candidates, including those listed in FIG. 5, selected a subset of four compounds which are believed to represent an optimal tradeoff between these various considerations. Specifically, the four gases which can be used (most likely in the alternative, but possibly in combination) are HFC-245ca (also known as R-245 or by its chemical name 1,1,2,2,3-pentafluoropentane), HFO-1234yf (also known by its chemical name 2,3,3,3-Tetrafluoroprop-1-ene), HFO-1234ZE (also known by its chemical name trans-1,3,3,3-Tetrafluoroprop-1-ene) and DR-11, which is a blend (azetrope) containing a percentage of HFO-1234yf that is made by Dupont, It should be noted that due to the numerous considerations described above, that perhaps none of these four gases can be considered to be optimal in every way as a test gas choice. For example, HFC-245ca and HFO-1234yf are considered to be flammable gases, which is clearly a suboptimal characteristic for a test gas to be used in a similitude test for compressors it will thus be appreciated by those skilled in the art that this is an indicator that selecting a test gas for such a similitude test requires both significant analysis and some compromise. More generally, according to exemplary embodiments a suitable test gas for usage in ASME PTC-10 similitude tests can comprise gases other than the four gases listed above which have certain characteristics or combination of characteristics. More specifically, such combinations of characteristics may comprise:

1. A test gas having a molecular weight between 40 g/gmol and 150 g/gmol, a global warming potential (GWP) of less than 700, and a gas specific heat ratio of between 1 and 1.5; or 2. A test gas having a molecular weight between 40 g/gmol and 150 g/gmol, a global warming potential (GWP) of between 1.50 and 700, a gas specific heat ratio of between 1 and 1.5, and which is non-flammable; or 3. A test gas having a molecular weight between 40 g/gmol and 150 g/gmol, a global warming potential (GWP) of between 50 and 150, and a gas specific heat ratio of between 1 and 1.5; or 4. A test gas having a molecular weight between 40 g/gmol and 150 g/gmol, a global warming potential (GWP) of between 0 and 50, and a gas specific heat ratio of between 1 and 1.5; or 5. A test gas having a molecular weight between 40 g/gmol and 150 g/gmol, a global warming potential (GWP) of between 50 and 150, and a gas specific heat ratio of between 1 and 1.3; or 6. A test gas having a molecular weight between 40 g/gmol and 150 g/gmol, a global warming potential (GWP) of between 50 and 150, and a gas specific heat ratio of between 1 and 1.3; or 7. A test gas having a molecular weight between 40 g/gmol and 150 g/gmol, a global warming potential (GWP) of between 60 and 120, and a gas specific heat ratio of between 1 and 1.5; or 8. A test gas having a molecular weight between 40 g/gmol and 150 g/gmol, a global warming potential (GWP) of between 90 and 110, and a gas specific heat ratio of between 1 and 1.5.

As mentioned earlier regardless of whether one of the four identified gases are selected as a substitute for HFC-134a or another gas having, for example, one of the sets of criteria listed above, the selected substitute gas may be used in purity or in a mixture with another gas, e.g., $CO_2$, N2, He, etc. As used herein, the phrase "selected substitute gas" refers to the gas which is selected to replace HFC-134a based on the criteria discussed herein, while the phrase "selected test gas" refers to the selection of the selected substitute gas either in purity or mixed with one or more other gases for a particular similitude test.

Figure 6:
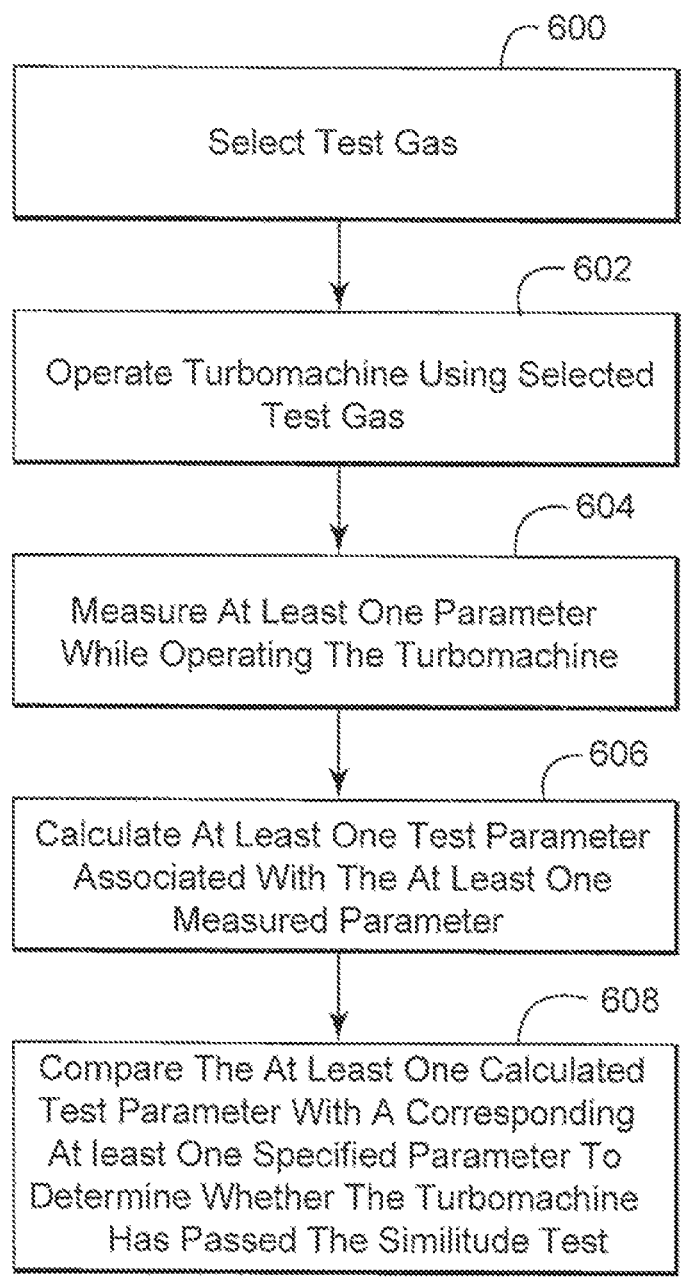
FIG. 6 is a flow chart showing a method for similitude testing of a turbomachine according to an embodiment of the present invention.

Once a suitable gas or mixture of gases is selected in accordance with ASME PTC-10 for a particular similitude test, the similitude test can be performed as, for example, illustrated in the flowchart of FIG. 6. Therein, a test gas is selected at step 600. This may, for example, comprise the initial selection of the substitute test gas as described above, e.g., a test gas having a molecular weight between 40 g/gmol and 150 g/gmol, a global warming potential (GWP) of less than 700, and a gas specific heat ratio of between 1 and 1.5, or one of the other seven sets of characteristics listed above, or more specifically one of the group consisting of HFC-245ca (also known as R-245 or by its chemical name 1,1,2,2,3-pentafluoropentane), HFO-1234yf (also known by its chemical name 2,3,3,3-Tetrafluoroprop-1-ene) 234ZE (also known by its chemical name trans-1,3,3,3-Tetrafluoroprop-1-ene) and DR-11. Alternatively, if a suitable substitute test gas has already been identified, then step 600 may represent the selection of the particular test gas for a particular compressor under test, i.e., whether to use the substitute test gas in purity or in a mixture with one or more other gases, e.g., $CH_4$, $CO_2$, N2, He, etc. Thus step 600 in FIG. 6 is intended to be generic to both of these steps either individually or in combination.

At step 602, the turbomachine is then run using the selected test gas. This step, and the following steps 604-608, can, for example, be performed in accordance with the ASME PTC-10 Class 2 or Class 3 tests to accomplish the similitude test. Thus, step 604 indicates that a measurement of at least one parameter (e.g., pressure rise and/or temperature rise) is taken while the turbomachine is being run using the selected, test gas. At step 606, the at least one measured parameter is used to calculate at least one test parameter, e.g., volumetric flow ratio, capacity/speed ratio, Mach number and/or Reynolds number. The calculated at least one test parameter is then compared to a corresponding at least one specified parameter, i.e., associated, with the turbomachine's intended usage at the site conditions 306, to determine whether the turbomachine has passed (or failed) the similitude test at step 608. This comparison could, for example, indicate whether the calculated at least one test parameter was within a predetermined amount of the corresponding at least one specified parameter, e.g., within a few percentage points. For the reader interested in more details regarding ASME PTC-10 testing in general, she or he is referred to the ASME specification entitled, PTC10-1997 Performance Test Code on Compressors Exhausters, at and available http://catalog.asme.org/Codes/PrintBook/PTC_10_1997_Test_Code.cfm, the disclosure of which is incorporated here by reference.

Figure 7:
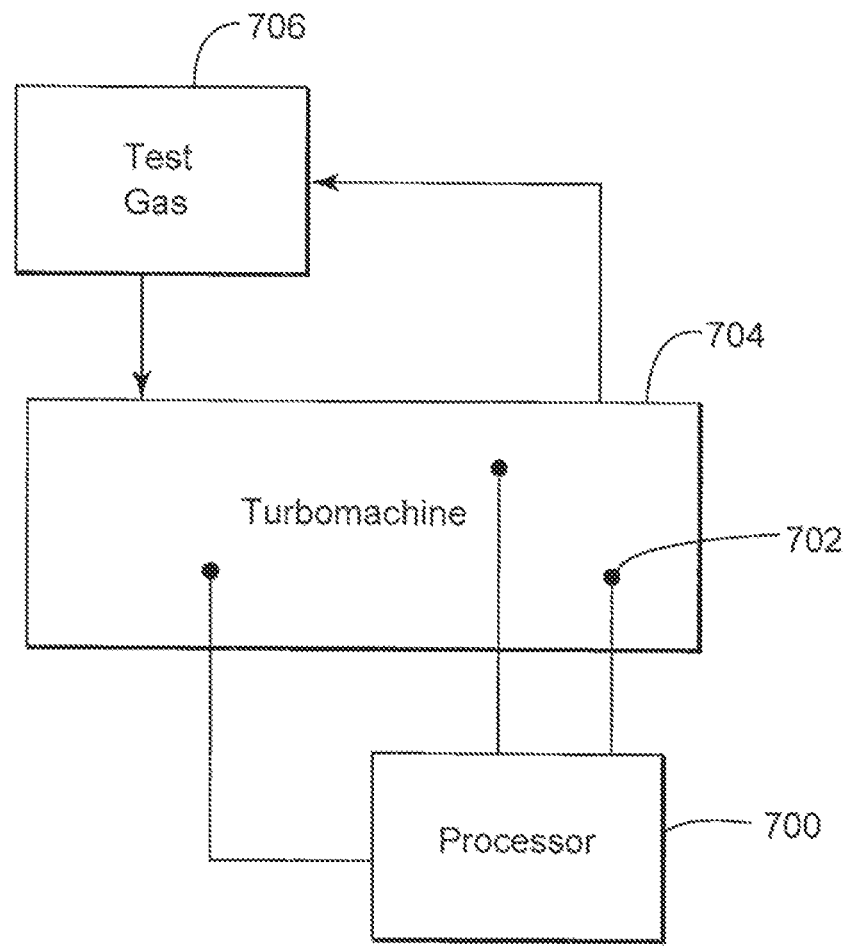
FIG. 7 shows a test system for performing similitude tests on a turbomachine according to an embodiment of the present invention.

The method of FIG. 6 can, for example, be performed using a similitude test system, an example of which is illustrated in FIG. 7. Therein, a processor 700 is connected to a plurality of sensors 702 which are connected to, or are in proximity with, a turbomachine 704 under test. The test gas, selected as described above, is provided to the inlet duct of turbomachine 704 by a test gas supply 706, and collected from the outlet duct. The testing system of FIG. 7 can operate in accordance with ASME PTC-10 to collect the required data, perform the specified calculations and output an indication of whether the similitude test is successful or not.

In the detailed description of the exemplary embodiments, numerous specific details are set forth in order to provide a comprehensive understanding of the claimed invention. However, one skilled in the art would understand that various embodiments may be practiced without such specific details. Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for similitude testing of a turbomachine, the method comprising:

selecting a test gas having a molecular weight between 40 g/gmol and 150 g/gmol, a global warming potential (GWP) of less than 700, and a gas specific heat ratio of between 1 and 1.5;

operating the turbomachine using the selected test gas;

identifying at least one parameter while operating the turbomachine;

establishing at least one test parameter associated with the at least one parameter; and comparing the at least one test parameter with a corresponding at least one specified parameter to determine whether the turbomachine has passed the similitude test.

2. The method of claim 1, wherein selecting the test gas further comprises selecting a test gas having a GWP between 150 and 700, the gas being non-flammable.

3. The method of claim 1, wherein selecting the test gas further comprises selecting a test gas having a GWP between 50 and 150.

4. The method of claim 1, wherein selecting the test gas further comprises selecting a test gas having a GWP between 0 and 50.

5. The method of claim 1, wherein selecting the test gas further comprises selecting a test gas having a gas specific heat ratio between 1.0 and 1.3.

6. The method of claim 1, wherein selecting the test gas further comprises selecting a test gas having a gas specific heat ratio between 1.1 and 1.25.

7. The method of claim 1, wherein selecting said test gas further comprises selecting a test gas having a GWP of between 60 and 120.

8. The method of claim 1, wherein selecting the test gas further comprises:

selecting, as the test gas, a gas from the group consisting of HFC-245ca (also known as R-245 or by its chemical name 1,1,2,2,3-pentafluoropentane), HFO-1234yf (also known by its chemical name 2,3,3,3-Tetrafluoroprop-1-ene), HFO-1234ZE (also known by its chemical name trans-1,3,3,3-Tetrafluoroprop-1-ene) and DR-11.

9. A test system for a turbomachine, the system comprising:

at least one sensor configured to measure at least one parameter while operating the turbomachine;

a processor configured to calculate at least one test parameter associated with the at least one measured parameter and to compare the at least one calculated test parameter with a corresponding at least one specified parameter to determine whether the turbomachine has passed the similitude test, wherein the turbomachine is operated using a selected test gas, the selected test gas having a molecular weight between 40 g/gmol and 150 g/gmol, a global warming potential (GWP) of less than 700, and a gas specific heat ratio of between 1 and 1.5.

10. A turbomachine made using a similitude testing method, including:

selecting a test gas having a molecular weight between 40 g/gmol and 150 g/gmol, a global warming potential (GWP) of less than 700, and a gas specific heat ratio of between 1 and 1.5;

operating the turbomachine using the selected test gas;

detecting at least one parameter while operating the turbomachine;

establishing at least one test parameter associated with the at least one parameter; and comparing the at least one test parameter with a corresponding at least one specified parameter to determine whether the turbomachine has passed the similitude test.

* * * * *